US012596294B2

(12) United States Patent  (10) Patent No.: US 12,596,294 B2
Hiroki et al.  (45) Date of Patent: Apr. 7, 2026

(54) LIGHT SOURCE APPARATUS AND PROJECTOR

(71) Applicant: SEIKO EPSON CORPORATION, Tokyo (JP)

(72) Inventors: Mizuha Hiroki, Zama (JP); Hidefumi Sakata, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 488 days.

(21) Appl. No.: 18/173,849

(22) Filed: Feb. 24, 2023

(65) Prior Publication Data

US 2023/0273513 A1     Aug. 31, 2023

(30) Foreign Application Priority Data

Feb. 25, 2022    (JP) .................................. 2022-027687

(51) Int. Cl.
    *G03B 21/20*       (2006.01)
    *H04N 9/31*       (2006.01)

(52) U.S. Cl.
    CPC ......... *G03B 21/206* (2013.01); *G03B 21/204* (2013.01); *G03B 21/2066* (2013.01); *H04N 9/3117* (2013.01)

(58) Field of Classification Search
    CPC ............... G03B 21/206; G03B 21/204; G03B 21/2066; G03B 21/00; G03B 21/14; G03B 21/208; H04N 9/3117; H04N 9/3105; H04N 9/3158; H04N 9/3164
    USPC .......................................................... 353/31
    See application file for complete search history.

(56) References Cited

U.S. PATENT DOCUMENTS

| | | | |
|---|---|---|---|
| 8,279,442 B2 | 10/2012 | Brukilacchio et al. | |
| 9,423,680 B2 | 8/2016 | Sakata et al. | |
| 9,921,353 B2 | 3/2018 | Hikmet et al. | |
| 10,386,559 B2 | 8/2019 | Hikmet et al. | |
| 2015/0029466 A1* | 1/2015 | Sakata .................. | H01S 5/1092 |
| | | | 362/268 |
| 2020/0066945 A1 | 2/2020 | Sakata et al. | |
| 2023/0221628 A1* | 7/2023 | Sakata ............... | G03B 21/2066 |
| | | | 353/98 |
| 2023/0221629 A1* | 7/2023 | Sakata ................. | G03B 21/208 |
| | | | 353/31 |

FOREIGN PATENT DOCUMENTS

| | | |
|---|---|---|
| JP | 2004-226738 A | 8/2004 |
| JP | 2011154930 A | 8/2011 |

(Continued)

*Primary Examiner* — Magda Cruz
(74) *Attorney, Agent, or Firm* — Dority & Manning, P.A.

(57) ABSTRACT

A light source apparatus according to an aspect of the present disclosure includes a light emitter, a wavelength conversion member, and an output section. The output section includes a first end section having a first surface facing the wavelength conversion member, a second end section located at the side opposite from the first end section, and second, third, fourth, and fifth surfaces in contact with the first and second end sections. The cross-sectional area of the output section taken along a plane perpendicular to the center axis gradually decreases from the first end section toward the second end section. The second, third, fourth, and fifth surfaces each incline with respect to the first surface. The inclination angle of each of the second, third, fourth, and fifth surfaces with respect to the first surface is greater than or equal to 40° but smaller than or equal to 58°.

7 Claims, 6 Drawing Sheets

(56)     References Cited

FOREIGN PATENT DOCUMENTS

| JP | 2015135461 A | 7/2015 |
| JP | 2016521438 A | 7/2016 |
| JP | 2016531381 A | 10/2016 |
| JP | 2020-034884 A | 3/2020 |

* cited by examiner

LIGHT SOURCE APPARATUS AND PROJECTOR

The present application is based on, and claims priority from JP Application Serial Number 2022-027687, filed Feb. 25, 2022, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light emitted from a light emitter.

JP-T-2016-521438 discloses a light source apparatus including a light emitter that emits blue light, a rod-shaped light guide containing a phosphor that converts the blue light in terms of wavelength, and a compound parabolic concentrator (CPC) that is provided at the end of the light guide. JP-T-2016-521438 describes that the CPC is used to improve the efficiency of light extraction from the light guide.

On the other hand, it has been desired to provide a new technology that can increase the efficiency at which the fluorescence is used by a downstream optical system without providing an angle conversion member, such as a CPC, at the end of the light guide, and can achieve an amount of light on a screen greater than or equal to the amount of light achieved by a light source apparatus including an angle conversion member, such as a CPC, when the light source apparatus based on the technology is incorporated in a projector.

SUMMARY

To achieve the object described above, a light source apparatus according to an aspect of the present disclosure includes a light emitter that emits first light having a first wavelength band, a wavelength conversion member that contains a fluorophore and converts the first light emitted from the light emitter into second light having a second wavelength band different from the first wavelength band, and an output section that is provided along a center axis of the wavelength conversion member and outputs the second light generated by the wavelength conversion member. The output section includes a first end section having a first surface facing the wavelength conversion member, a second end section located at a side opposite from the first end section along the center axis, a second surface in contact with the first and second end sections, a third surface in contact with the first and second end sections, a fourth surface in contact with the first and second end sections, and a fifth surface in contact with the first and second end sections. A cross-sectional area of the output section taken along a plane perpendicular to the center axis gradually decreases from the first end section toward the second end section. The second, third, fourth, and fifth surfaces each incline with respect to the first surface. An inclination angle of each of the second, third, fourth, and fifth surfaces with respect to the first surface is greater than or equal to 40° but smaller than or equal to 58°.

A projector according to another aspect of the present disclosure includes the light source apparatus according to the aspect of the present disclosure, a light modulator that modulates light outputted from the light source apparatus and containing the second light in accordance with image information, and a projection optical apparatus that projects the light modulated by the light modulator.

DESCRIPTION OF EXEMPLARY EMBODIMENTS

An embodiment of the present disclosure will be described below with reference to the drawings.

A projector according to the present embodiment is an example of a projector using a liquid crystal panel as a light modulator.

In the following drawings, components may be drawn at different dimensional scales for clarification of each of the components.

Figure 1:
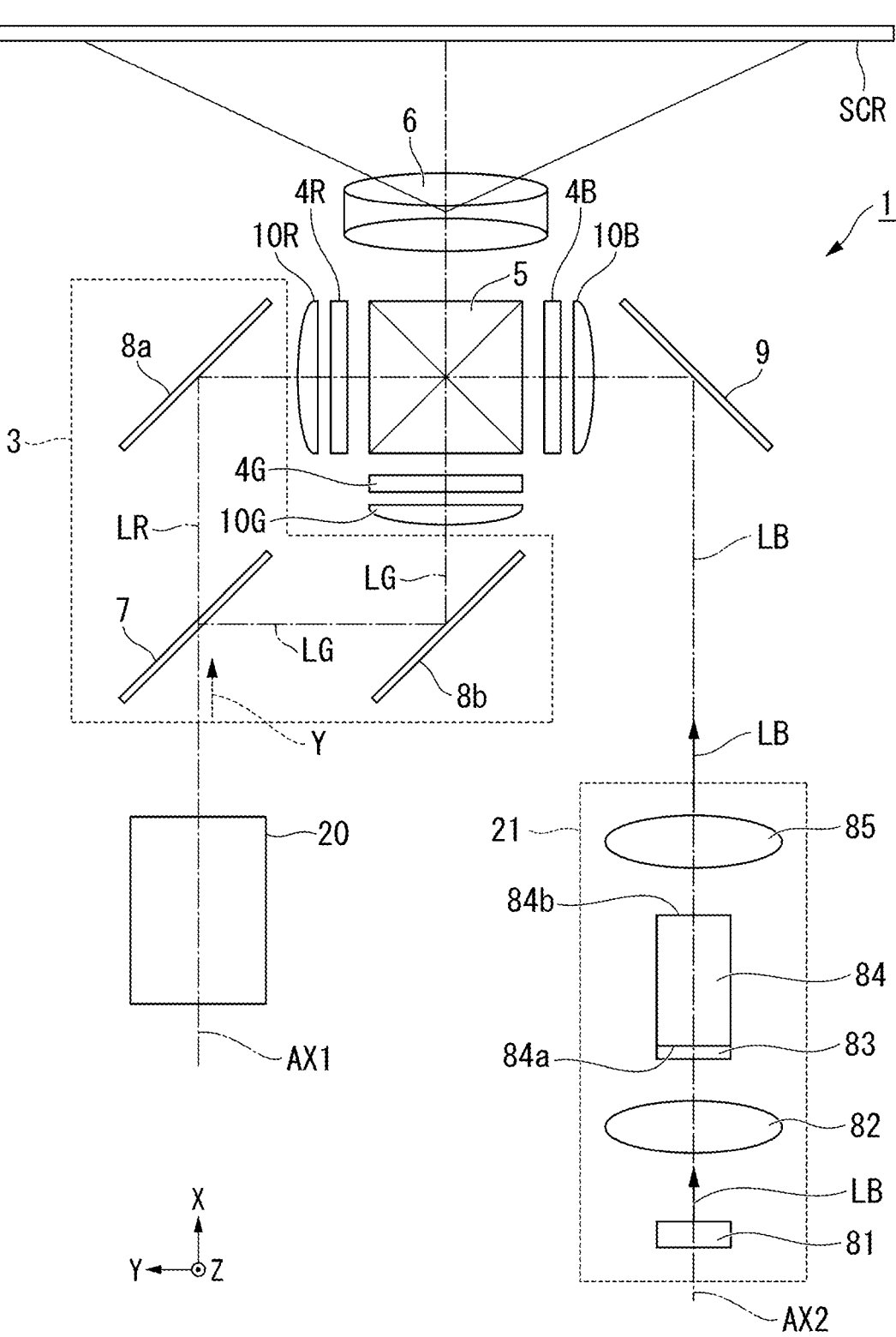
FIG. 1 is a schematic configuration diagram of a projector according to an embodiment.

FIG. 1 shows a schematic configuration of a projector 1 according to the present embodiment.

The projector 1 according to the present embodiment is a projection-type image display apparatus that displays a color image on a screen (projection receiving surface) SCR, as shown in FIG. 1. The projector 1 includes three light modulators corresponding to three types of color light, red light LR, green light LG, and blue light LB.

The projector 1 includes a first illuminator 20, a second illuminator 21, a color separation system 3, light modulators 4R, 4G, and 4B, a light combiner 5, and a projection optical apparatus 6.

The first illuminator 20 outputs yellow fluorescence Y toward the color separation system 3. The second illuminator 21 outputs blue light LB toward the light modulator 4B. Detailed configurations of the first illuminator 20 and the second illuminator 21 will be described later.

The following description with reference to the drawings will be made by using an XYZ orthogonal coordinate system as required. The axis Z is an axis extending along the upward-downward direction of the projector 1. The axis X is an axis parallel to an optical axis AX1 of the first illuminator 20 and an optical axis AX2 of the second illuminator 21. The axis Y is an axis perpendicular to the axes X and Z. The optical axis AX1 of the first illuminator 20 is the center axis of the fluorescence Y outputted from the first illuminator 20. The optical axis AX2 of the second illuminator 21 is the center axis of the blue light LB outputted from the second illuminator 21.

The color separation system 3 separates the yellow fluorescence Y outputted from the first illuminator 20 into the red light LR and the green light LG. The color separation system 3 includes a dichroic mirror 7, a first reflection mirror 8a, and a second reflection mirror 8b.

The dichroic mirror 7 separates the fluorescence Y into the red light LR and the green light LG. The dichroic mirror 7 transmits the red light LR and reflects the green light LG. The second reflection mirror 8b is disposed in the optical path of the green light LG. The second reflection mirror 8b reflects the green light LG reflected off the dichroic mirror 7 toward the light modulator 4G. The first reflection mirror 8a is disposed in the optical path of the red light LR. The first reflection mirror 8a reflects the red light LR having passed through the dichroic mirror 7 toward the light modulator 4R.

On the other hand, the blue light LB outputted from the second illuminator 21 is reflected off a reflection mirror 9 toward the light modulator 4B.

The configuration of the second illuminator 21 will be described below.

The second illuminator 21 includes a light source section 81, a focusing lens 82, a diffuser plate 83, a rod lens 84, and a relay lens 85. The light source section 81 is formed of at least one semiconductor laser. The light source section 81 outputs the blue light LB formed of laser light. The light source section 81 is not necessarily formed of a semiconductor laser and may be formed of an LED that outputs blue light.

The focusing lens 82 is formed of a convex lens. The focusing lens 82 causes the blue light LB outputted from the light source section 81 to be incident on the diffuser plate 83 with the blue light LB substantially focused thereon. The diffuser plate 83 diffuses the blue light LB having exited out of the focusing lens 82 into blue light LB diffused by a predetermined degree to generate blue light LB having a substantially uniform light orientation distribution similar to that of the fluorescence Y outputted from the first illuminator 20. The diffuser plate 83 is, for example, a ground glass plate made of optical glass.

The blue light LB diffused by the diffuser plate 83 enters the rod lens 84. The rod lens 84 has a quadrangular columnar shape extending along the optical axis AX2 of the second illuminator 21. The rod lens 84 has a light incident end surface 84a provided at one end of the rod lens 84 and a light exiting end surface 84b provided at the other end thereof. The diffuser plate 83 is fixed to the light incident end surface 84a of the rod lens 84 via an optical adhesive (not shown). It is desirable that the refractive index of the diffuser plate 83 matches as much as possible with the refractive index of the rod lens 84.

The blue light LB propagates through the interior of the rod lens 84 while being totally reflected therein and exits via the light exiting end surface 84b with the illuminance distribution uniformity of the blue light LB increased. The blue light LB having exited out of the rod lens 84 enters the relay lens 85. The relay lens 85 causes the blue light LB having the illuminance distribution uniformity increased by the rod lens 84 to be incident on the reflection mirror 9.

The light exiting end surface 84b of the rod lens 84 has a rectangular shape substantially similar to the shape of an image formation region of the light modulator 4B. The blue light LB having exited out of the rod lens 84 is thus efficiently incident on the image formation region of the light modulator 4B.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed on the light incident and exiting sides of each of the liquid crystal panels. The polarizers each transmit only linearly polarized light polarized in a specific direction.

A field lens 10R is disposed at the light incident side of the light modulator 4R. A field lens 10G is disposed at the light incident side of the light modulator 4G. A field lens 10B is disposed at the light incident side of the light modulator 4B. The field lens 10R parallelizes the chief ray of the red light LR to be incident on the light modulator 4R. The field lens 10G parallelizes the chief ray of the green light LG to be incident on the light modulator 4G. The field lens 10B parallelizes the chief ray of the blue light LB to be incident on the light modulator 4B.

The light combiner 5 receives the image light outputted from the light modulator 4R, the image light outputted from the light modulator 4G, and the image light outputted from the light modulator 4B, combines the image light corresponding to the red light LR, the image light corresponding to the green light LG, and the image light corresponding to the blue light LB with one another, and outputs the combined image light toward the projection optical apparatus 6. The light combiner 5 is, for example, a cross dichroic prism.

The projection optical apparatus 6 is formed of a plurality of projection lenses. The projection optical apparatus 6 enlarges the combined image light from the light combiner 5 and projects the enlarged image light toward the screen SCR. An image is thus displayed on the screen SCR.

The configuration of the first illuminator 20 will be described below.

Figure 2:
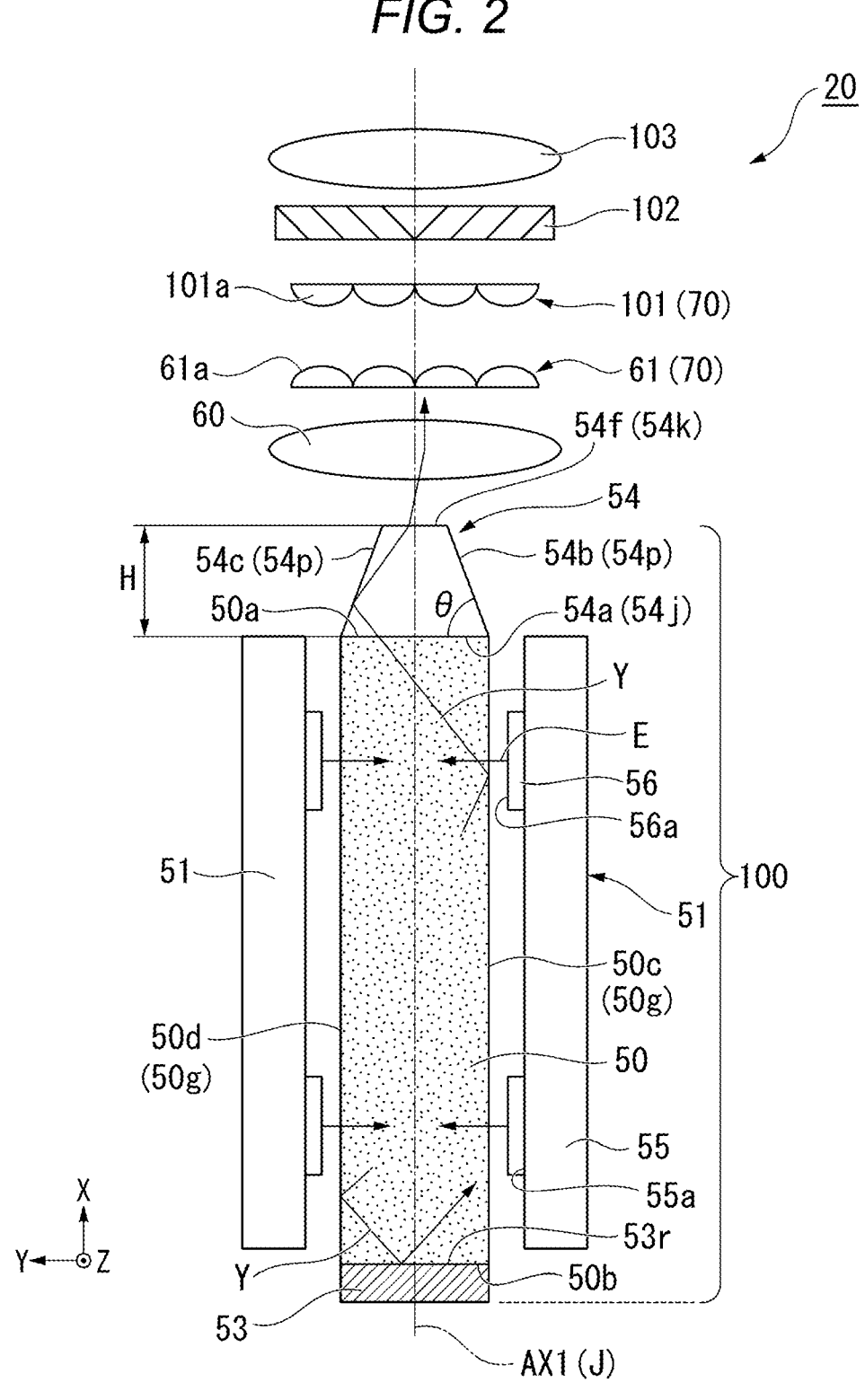
FIG. 2 is a schematic configuration diagram of a first illuminator in the embodiment.
Figure 3:
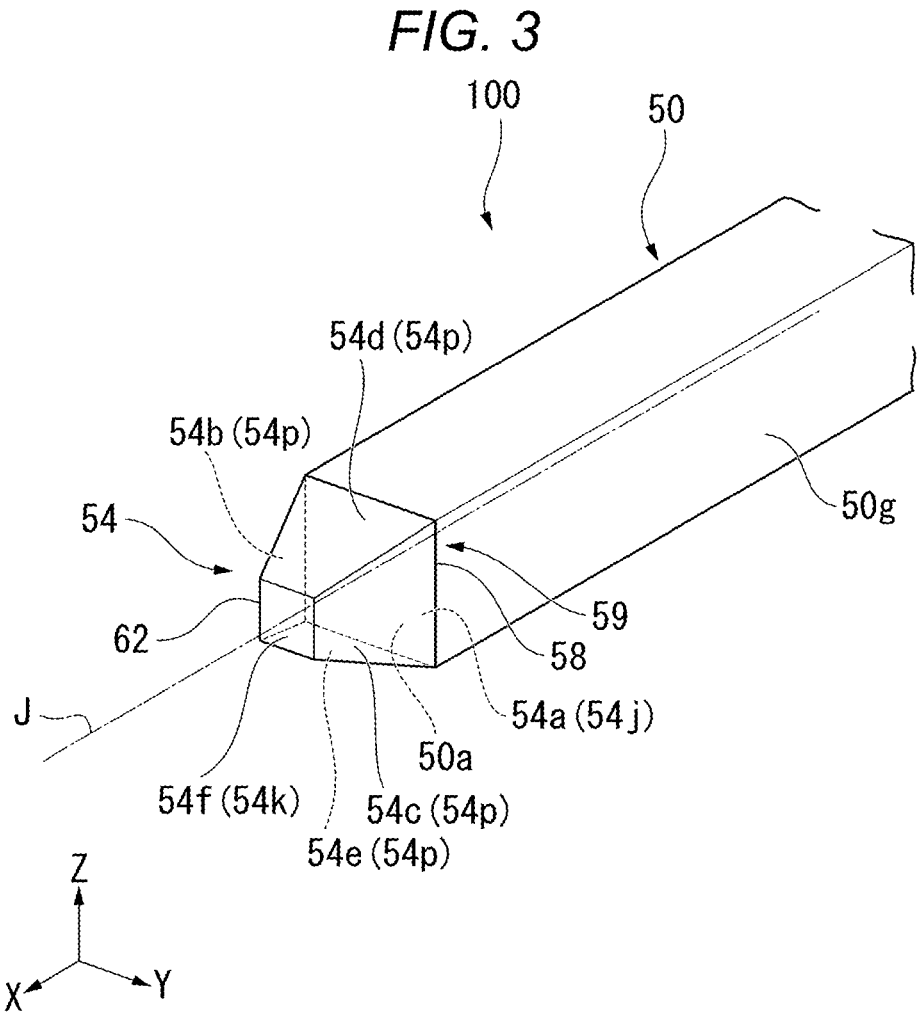
FIG. 3 is a perspective view of a light source apparatus.

FIG. 2 is a schematic configuration diagram of the first illuminator 20. FIG. 3 is a perspective view of a light source apparatus 100.

The first illuminator 20 includes the light source apparatus 100, an optical integration system 70, a polarization converter 102, and a superimposing system 103, as shown in FIG. 2.

The light source apparatus 100 includes a wavelength conversion member 50, a light source section 51, a reflection member 53, and an output section 54, as shown in FIGS. 2 and 3. The light source section 51 includes a substrate 55 and light emitters 56.

The wavelength conversion member 50 has a quadrangular columnar shape extending in the axis-X direction and has six surfaces. The sides of the wavelength conversion member 50 that extend in the axis-X direction are longer than the sides of the wavelength conversion member 50 that extend in the axis-Y direction and the sides thereof that extend in the axis-Z direction. The axis-X direction therefore corresponds to the longitudinal direction of the wavelength conversion member 50. The length of the sides extending in the axis-Y direction is equal to the length of the sides extending in the axis-Z direction. That is, the wavelength conversion member 50 has a square cross-sectional shape taken along a plane perpendicular to the axis-X direction. The wavelength conversion member 50 may instead have an oblong cross-sectional shape taken along a plane perpendicular to the axis-X direction.

The wavelength conversion member 50 has the following surfaces. First, the wavelength conversion member 50 has an output surface 50a, which intersects with the longitudinal direction (axis-X direction) of the wavelength conversion member 50 and at which the output section 54 is provided, and a reflection surface 50b, which intersects with the longitudinal direction (axis-X direction) of the wavelength conversion member 50 and is located at the side opposite from the output surface 50a. The wavelength conversion member 50 further has a first side surface 50c and a second side surface 50d, which intersect with the output surface 50a and the reflection surface 50b and are located at opposite sides. The wavelength conversion member 50 still further has a third side surface and a fourth side surface (not shown) that intersect with the output surface 50a and the reflection surface 50b and with the first side surface 50c and the second side surface 50d and are located at opposite sides. In the following description, the four surfaces described above, that is, the first side surface 50c, the second side surface 50d, the third side surface, and the fourth side surface are collectively referred to as a side surface 50g.

An axis passing through the center of the output surface 50a and the center of the reflection surface 50b of the wavelength conversion member 50 and parallel to the axis X is defined as a center axis J of the wavelength conversion member 50. The center axis J of the wavelength conversion member 50 coincides with the optical axis AX1 of the first illuminator 20.

In the present embodiment, in which the wavelength conversion member 50 and the output section 54 are integrated into a single member, as will be described below, the output surface 50a out of the six surfaces described above is not a physically existing surface but is defined as an imaginary surface that specifies the boundary between the wavelength conversion member 50 and the output section 54, which has a truncated quadrangular pyramidal shape. The wavelength conversion member 50 does not necessarily have a quadrangular columnar shape.

The wavelength conversion member 50 at least contains a phosphor and converts excitation light E having a first wavelength band into the fluorescence Y having a second wavelength band different from the first wavelength band. In the present embodiment, the excitation light E enters the wavelength conversion member 50 via the first side surface 50c and the second side surface 50d. The fluorescence Y is guided through the interior of the wavelength conversion member 50, then enters the output section 54, and is outputted from the output section 54. The excitation light E in the present embodiment corresponds to the first light in the claims. The fluorescence Y in the present embodiment corresponds to the second light in the claims.

The wavelength conversion member 50 contains a ceramic phosphor formed of a polycrystal phosphor that converts the excitation light E in terms of wavelength into the fluorescence Y. The second wavelength band of the fluorescence Y is, for example, a yellow wavelength band ranging from 490 to 750 nm. That is, the fluorescence Y is yellow fluorescence containing a red light component and a green light component.

The wavelength conversion member 50 may contain a single crystal phosphor in place of a polycrystal phosphor. The wavelength conversion member 50 may instead be made of fluorescent glass. Still instead, the wavelength conversion member 50 may be formed of a binder which is made of glass or resin and in which a large number of phosphor particles are dispersed. The wavelength conversion member 50 made of any of the materials described above converts the excitation light E into the fluorescence Y having the second wavelength band.

Specifically, the material of the wavelength conversion member 50 contains, for example, an yttrium-aluminum-garnet-based (YAG-based) phosphor. Consider YAG:Ce, which contains cerium (Ce) as an activator by way of example, and the wavelength conversion member 50 is made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The light source section 51 includes the light emitters 56 each having a light emitting surface 56a, via which the excitation light E having the first wavelength band is emitted. The light source section 51 is provided so as to face the first side surface 50c and the second side surface 50d of the wavelength conversion member 50. The light emitters 56 are each formed, for example, of a light emitting diode (LED). The light source section 51 is thus provided so as to face part of the side surface 50g, which extends along the longitudinal direction of the wavelength conversion member 50. In other words, the side surface 50g along the longitudinal direction of the wavelength conversion member 50 receives the excitation light E. The light source section 51 may be formed of any number of light source sections 51, and may have any arrangement.

The light emitting surface 56a of each of the light emitters 56 is disposed so as to face the first side surface 50c or the second side surface 50d of the wavelength conversion member 50, and the excitation light E is emitted via each of the light emitting surfaces 56a toward the first side surface 50c or the second side surface 50d. The first wavelength band is, for example, a blue-violet wavelength band ranging from 400 to 480 nm and has a peak wavelength of, for example, 445 nm.

The substrate 55 supports the light emitters 56. A plurality of light emitters 56 are provided at one surface 55a of the substrate 55. In the present embodiment, the light source section 51 is formed of the light emitters 56 and the substrate 55 and may further include a light guiding plate, a diffuser plate, a lens, and other optical members. The number of light emitters 56 provided at the substrate 55 is not limited to a specific number.

The reflection member 53 is provided so as to face the reflection surface 50b of the wavelength conversion member 50. The reflection member 53 reflects the fluorescence Y having been guided through the interior of the wavelength conversion member 50 and having reached the reflection surface 50b. The reflection member 53 is a member separate from the wavelength conversion member 50 and is formed, for example, of a plate-shaped member made of a metal material such as aluminum. The reflection member 53 faces the reflection surface 50b of the wavelength conversion member 50 and has a reflection surface 53r, which reflects the fluorescence Y. The reflection surface 53r may be the surface of the metal material itself or may be formed of a metal film or a dielectric multilayer film formed at the surface of the metal material.

In the light source apparatus 100, when the excitation light E outputted from the light emitters 56 enters the wavelength conversion member 50, the phosphor contained in the wavelength conversion member 50 is excited, and emits the fluorescence Y from arbitrary light emission points. The fluorescence Y travels omnidirectionally from the arbitrary light emission points, and the fluorescence Y traveling toward the side surface 50g then travels toward the output surface 50a or the reflection surface 50b while being repeatedly totally reflected off the side surface 50g at a plurality of locations. The fluorescence Y traveling toward the output surface 50a enters the output section 54. On the other hand, the fluorescence Y traveling toward the reflection surface 50b is reflected off the reflection member 53 and then travels toward the output surface 50a.

Out of the excitation light E having entered the wavelength conversion member 50, a portion, of the excitation light E, that has not been used to excite the phosphor is reflected off members around the wavelength conversion member 50, including the light emitters 56 of the light source section 51, or the reflection member 53 provided at the reflection surface 50b. The portion of the excitation light E is therefore confined in the wavelength conversion member 50 and reused.

The output section 54 is provided along the center axis J of the wavelength conversion member 50. The output section 54 outputs the fluorescence Y generated by the wavelength conversion member 50. In the present embodiment, the wavelength conversion member 50 and the output section 54 are integrated into a single member. The output section 54 therefore contains the YAG-based phosphor, as the wavelength conversion member 50 does.

The output section 54 has a first end section 54j having a first surface 54a, a second end section 54k having a sixth surface 54f, a second surface 54b, a third surface 54c, a fourth surface 54d, and a fifth surface 54e, as shown in FIG. 3. The first surface 54a faces the output surface 50a of the wavelength conversion member 50. Since the wavelength conversion member 50 and the output section 54 are integrated into a single member as described above, the first surface 54a is not a physically existing surface, but is an imaginary surface that specifies the boundary between the output section 54 and the wavelength conversion member 50. The second end section 54k is located at the side opposite from the first end section 54j along the center axis J. The second surface 54b, the third surface 54c, the fourth surface 54d, and the fifth surface 54e are each in contact with the first end section 54j and the second end section 54k. The sixth surface 54f is in contact with the second surface 54b, the third surface 54c, the fourth surface 54d, and the fifth surface 54e, and intersects with the center axis J.

The output section 54 has a truncated quadrangular pyramidal shape. The first surface 54a therefore corresponds to the bottom surface of the truncated quadrangular pyramid. The sixth surface 54f corresponds to the top surface of the truncated quadrangular pyramid. The second surface 54b, the third surface 54c, the fourth surface 54d, and the fifth surface 54e each correspond to the side surface of the truncated quadrangular pyramid. The second surface 54b, the third surface 54c, the fourth surface 54d, and the fifth surface 54e are each provided with no reflective layer. The cross-sectional area of the output section 54 taken along a plane perpendicular to the center axis J gradually decreases from the first end section 54j toward the second end section 54k.

The second surface 54b, the third surface 54c, the fourth surface 54d, and the fifth surface 54e each incline with respect to the first surface 54a. An inclination angle θ of each of the second surface 54b, the third surface 54c, the fourth surface 54d, and the fifth surface 54e with respect to the first surface 54a is greater than or equal to 40° but smaller than or equal to 58°. The inclination angle θ is an internal angle of the output section 54. The rationale for the numerical range of the inclination angle θ will be described later. The output section 54 is formed, for example, by grinding an end of the wavelength conversion member 50 having a quadrangular columnar shape into a truncated quadrangular pyramidal shape. The second surface 54b, the third surface 54c, the fourth surface 54d, and the fifth surface 54e are hereafter collectively referred to as a side surface 54p.

When viewed in the direction of the center axis J, the first surface 54a and the sixth surface 54f each have a square shape. The length of one side of the first surface 54a coincides with the length of one side of the output surface 50a of the wavelength conversion member 50. The length of one side of the sixth surface 54f may be set at a predetermined value as appropriate. The length between the first surface 54a and the sixth surface 54f along the center axis J (height of truncated quadrangular pyramid) may also be set at a predetermined value as appropriate. The ratio of the area of the sixth surface 54f to the area of the first surface 54a is desirably greater than or equal to 26% but smaller than or equal to 51%. The reason why the numerical range described above is desirable will be described later.

A corner 58, where the side surface 50g of the wavelength conversion member 50 and the side surface 54p of the output section 54 are in contact with each other, is provided with a chamfered section 59. That is, the corner 58, where the side surface 50g and the side surface 54p is in contact with each other, is not sharp but is formed of a curved surface having curvature. Furthermore, in the output section 54, the corner where adjacent ones of the second surface 54b, the third surface 54c, the fourth surface 54d, and the fifth surface 54e are in contact with each other may be provided with a chamfered section 59. Moreover, a corner 62, where the second surface 54b, the third surface 54c, the fourth surface 54d, and the fifth surface 54e are each in contact with the sixth surface 54f, may be provided with the chamfered section 59. The chamfered sections 59 are not necessarily provided.

The optical integration system 70 includes a first lens array 61 and the second lens array 101, as shown in FIG. 2. The optical integration system 70, along with the superimposing system 103, forms an illumination homogenizing system that homogenizes the intensity distribution of the fluorescence Y outputted from the light source apparatus 100 at each of the light modulators 4R and 4G, which are illumination receiving regions. The fluorescence Y outputted via the sixth surface 54f of the output section 54 enters a collimator lens 60, and the fluorescence Y having exited out of the collimator lens 60 enters the first lens array 61. The first lens array 61, along with the second lens 101 provided in a position downstream from the light source apparatus 100, forms the optical integration system 70.

The first lens array 61 includes a plurality of first lenslets 61a. The plurality of first lenslets 61a are arranged in a matrix in a plane parallel to the plane YZ perpendicular to the optical axis AX1 of the first illuminator 20. The plurality of first lenslets 61a divide the fluorescence Y outputted from the angle conversion member 52 into a plurality of subluminous fluxes. The first lenslets 61a each have a rectangular shape substantially similar to the shape of the image formation region of each of the light modulators 4R and 4G. The sub-luminous fluxes having exited out of the first lens array 61 are thus each efficiently incident on the image formation region of each of the light modulators 4R and 4G.

The fluorescence Y having exited out of the first lens array 61 travels toward the second lens array 101. The second lens array 101 is disposed so as to face the first lens array 61. The second lens array 101 includes a plurality of second lenslets 101a corresponding to the plurality of first lenslets 61a of the first lens array 61. The second lens array 101 along with the superimposing system 103 brings images of the plurality of first lenslets 61a of the first lens array 61 into focus in the vicinity of the image formation region of each of the light modulators 4R and 4G. The plurality of second lenslets 101a are arranged in a matrix in a plane parallel to the plane YZ perpendicular to the optical axis AX1 of the first illuminator 20.

In the present embodiment, the first lenslets 61a of the first lens array 61 and the second lenslets 101a of the second lens array 101 have the same size, and may instead have sizes different from each other. In the present embodiment, the first lenslets 61a of the first lens array 61 and the second lenslets 101a of the second lens array 101 are so disposed that the optical axes thereof coincide with each other, and may instead be so disposed that the optical axes thereof deviate from each other.

The polarization converter 102 converts the polarization direction of the fluorescence Y having exited out of the second lens array 101. Specifically, the polarization converter 102 converts sub-luminous fluxes of the fluorescence Y into which the first lens array 61 divides the fluorescence Y and which exit out of the second lens array 101 into linearly polarized sub-luminous fluxes.

The polarization converter 102 includes polarization separation layers (not shown) that directly transmit one of polarized light components contained in the fluorescence Y outputted from the light source apparatus 100 and reflect another one of the polarized light components in a direction perpendicular to the optical axis AX1, reflection layers (not shown) that reflect the other linearly polarized light component reflected off the polarization separation layers in the direction parallel to the optical axis AX1, and retardation films (not shown) that convert the other linearly polarized light component reflected off the reflection layers into the one linearly polarized light component.

Comparative Example

A light source apparatus according to Comparative Example will be descried below.

To examine the effects of the light source apparatus according to the present embodiment, the present inventor has assumed a light source apparatus according to Comparative Example shown below and conducted a simulation on fluorescence extraction efficiency.

Figure 9:
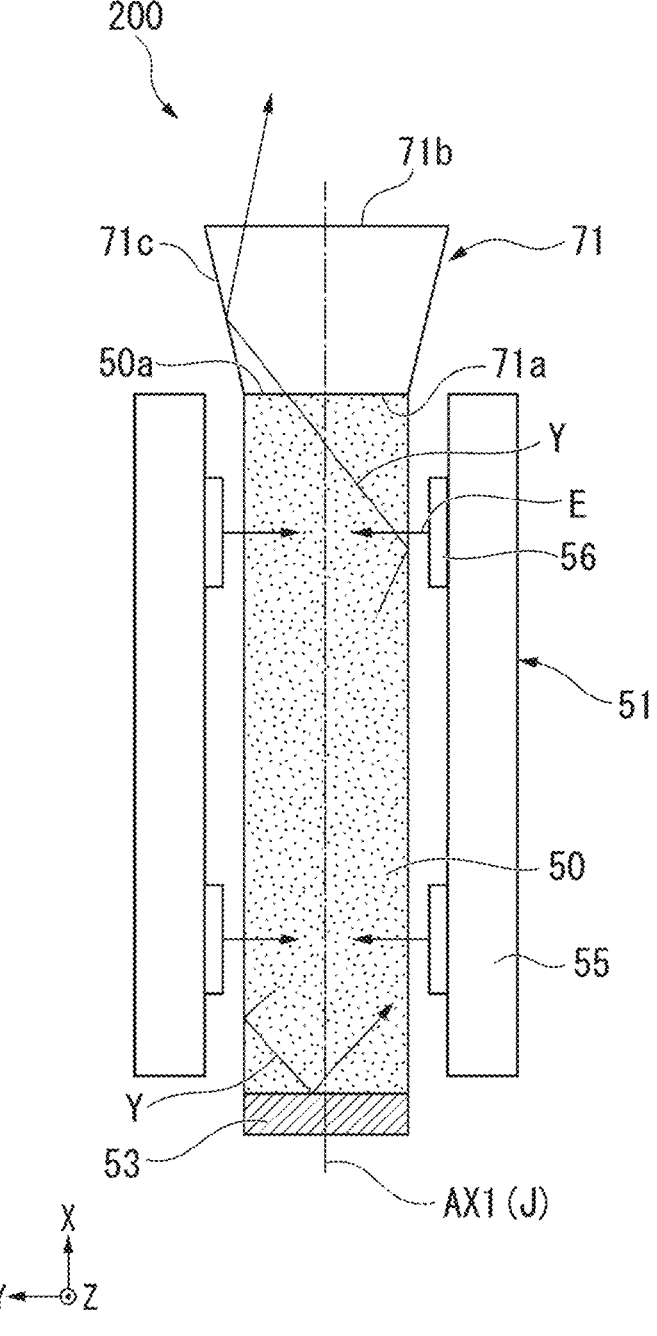
FIG. 9 is a schematic configuration diagram of the light source apparatus according to Comparative Example (PRIOR ART).

FIG. 9 is a schematic configuration diagram of a light source apparatus 200 according to Comparative Example.

In FIG. 9, components common to those in FIG. 2 in the present embodiment have the same reference characters and will not be described.

The light source apparatus 200 according to Comparative Example includes the light source section 51, the wavelength conversion member 50, and an angle conversion member 71, as shown in FIG. 9. The angle conversion member 71 has a truncated quadrangular pyramidal shape having a cross-sectional area that gradually widens from an input surface 71a toward an output surface 71b.

The fluorescence Y having entered the angle conversion member 71 changes its orientation while traveling through the interior of the angle conversion member 71 in such a way that the direction of the fluorescence Y approaches the direction parallel to the center axis J whenever the fluorescence Y is totally reflected off a side surface 71c. The angle conversion member 71 thus converts the output angle distribution of the fluorescence Y outputted via the output surface 50a of the wavelength conversion member 50. Specifically, the angle conversion member 71 makes the largest output angle of the fluorescence Y at the output surface 71b smaller than the largest input angle of the fluorescence Y at the input surface 71a. The efficiency of extraction of the fluorescence Y outputted from the angle conversion member 71 can thus be increased, as compared with the efficiency achieved by a light source apparatus that does not include the angle conversion member 71. As the angle conversion member 71, a tapered rod is used in the example described above, and a CPC can instead be used.

As the conditions of the simulation, it was assumed that the wavelength conversion member 50 was made of a typical YAG fluorophore and had a refractive index set at 1.83. It was further assumed that the output surface 50a had a square shape, and that one side of the output surface 50a had a length of 1.0 mm. The angle conversion member 71 was assumed to be made of N—BK7, which is an optical glass material, and have a refractive index of 1.52. It was assumed that one side of the input surface 71a had a length of 1.0 mm, that one side of the output surface 71b has a length of 3.2 mm, and that the length from the input surface 71a to the output surface 71b along the center axis J was 5.1 mm.

On the other hand, it was assumed that the conditions of the simulation on the wavelength conversion member 50 of the light source apparatus 100 according to the present embodiment are the same as those for the light source apparatus 200 according to Comparative Example. The inclination angle θ of the side surface 54p with respect to the first surface 54a was changed among five values, 35°, 40°, 45°, 55°, and 70°, on the assumption that one side of the first surface 54a of the output section 54 had the length of 1.0 mm, and that the height H of the output section 54 (see FIG. 2) was fixed at 1.0 mm.

The light source apparatuses were evaluated in terms of the efficiency of the fluorescence outputted from the light source apparatus, and the efficiency of the fluorescence on the screen projected from the projector that incorporates the light source apparatus. In Comparative Example, the efficiency of the fluorescence Y outputted from the light source apparatus 200 was defined as the ratio of the amount of fluorescence Y extracted from the angle conversion member 71 to the amount of fluorescence Y generated by the wavelength conversion member 50. In the present embodiment, the efficiency of the fluorescence Y outputted from the light source apparatus 100 was defined as the ratio of the amount of fluorescence Y extracted via the sixth surface 54f of the output section 54 to the amount of fluorescence Y generated by the wavelength conversion member 50. The efficiency of the fluorescence Y on the screen was defined as the ratio of the amount of fluorescence Y that reaches the screen to the amount of fluorescence Y outputted from the wavelength conversion member 50 both in Comparative Example and the present embodiment.

Figure 4:
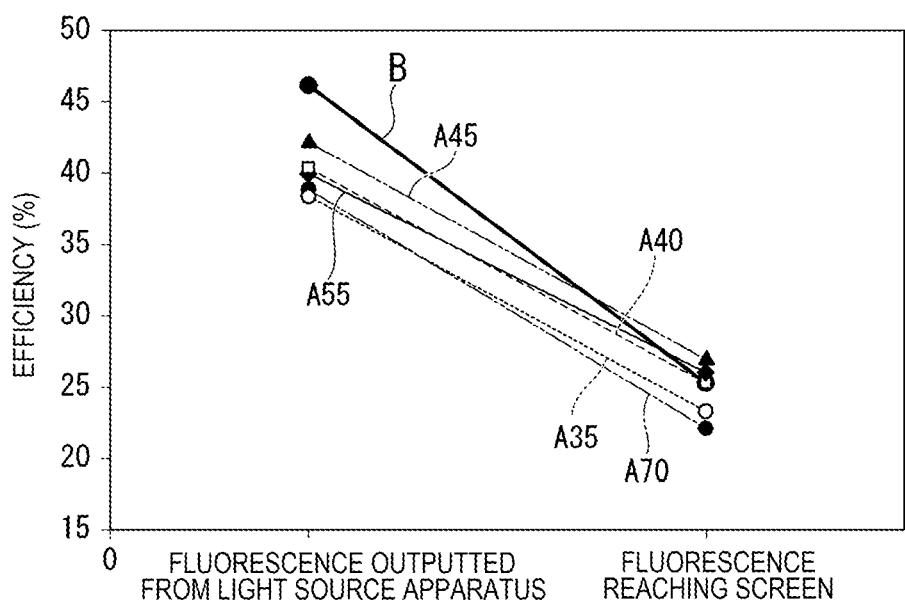
FIG. 4 shows graphs illustrating how light efficiency changes when the inclination angle of the side surface of an output section is changed.

FIG. 4 shows graphs illustrating the results of the simulation. The horizontal axis of FIG. 4 represents the fluorescence Y outputted from the light source apparatus and the fluorescence Y reaching the screen, and the vertical axis of FIG. 4 represents the efficiency of fluorescence Y (%). The graphs labeled with the characters A35, A40, A45, A55, and A70 show the results of the simulation conducted on the light source apparatus 100 according to the present embodiment, the graph labeled with the character A35 showing the case where the inclination angle θ is 35°, the graph labeled with the character A40 showing the case where the inclination angle θ is 40°, the graph labeled with the character A45 showing the case where the inclination angle θ is 45°, the graph labeled with the character A55 showing the case where the inclination angle θ is 55°, and the graph labeled with the character A70 showing the case where the inclination angle θ is 70°. The graph labeled with the character B shows the result of the simulation conducted on the light source apparatus 200 according to Comparative Example.

In the case of the light source apparatus 200 according to Comparative Example, the fluorescence Y outputted from the light source apparatus 200 shows a high efficiency of about 46% due to the effect of the angle conversion member 71, as shown in FIG. 4. The efficiency of the fluorescence Y reaching the screen, however, decreases to about 25% due to the fact that out of the fluorescence outputted from the angle conversion member 71, the fluorescence outputted at large angles does not enter the downstream optical system and results in a loss and other reasons.

In contrast, in the case of the light source apparatus 100 according to the present embodiment, the efficiency of the fluorescence Y outputted from the light source apparatus 100 is lower than that of the efficiency achieved by the light source apparatus 200 according to Comparative Example at any of the inclination angles described above. It is, however, demonstrated that the efficiency of the fluorescence Y reaching the screen achieved by the light source apparatus 100 according to the present embodiment is higher than the efficiency achieved by the light source apparatus 200 according to Comparative Example when the inclination angle θ is set at 45° or 55°, that the efficiency achieved by the light source apparatus 100 according to the present embodiment is approximately equal to the efficiency achieved by the light source apparatus 200 according to Comparative Example when the inclination angle θ is set at 40°, and that the efficiency achieved by the light source apparatus 100 according to the present embodiment is lower than the efficiency achieved by the light source apparatus 200 according to Comparative Example when the inclination angle θ is set at 35° or 70°. That is, it is demonstrated that the efficiency of the fluorescence Y reaching the screen achieved by the light source apparatus 100 according to the present embodiment is higher than the efficiency achieved by the light source apparatus 200 according to Comparative Example when the inclination angle θ is set at a value that falls within a predetermined range.

In view of the findings described above, the present inventor further conducted a simulation on the efficiency of the fluorescence Y reaching the screen by changing the inclination angle θ at smaller intervals in the light source apparatus 100 according to the present embodiment.

Figure 5:
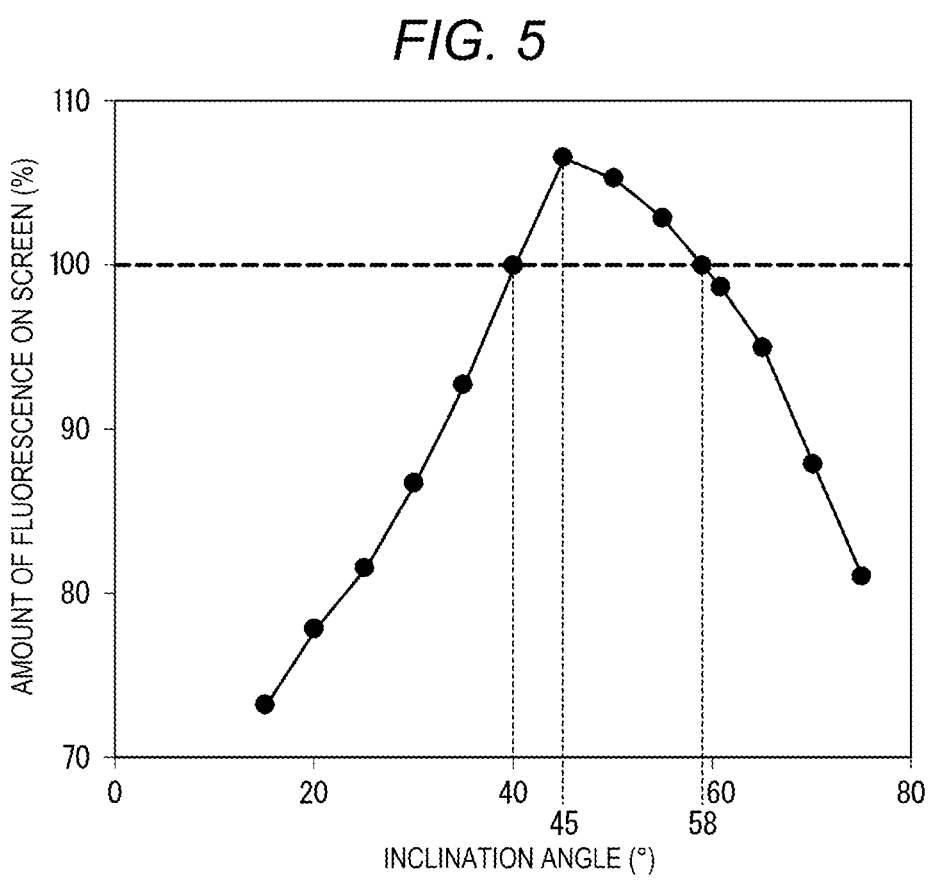
FIG. 5 is a graph showing the relationship between the inclination angle and the amount of light on the screen.

FIG. 5 is a graph showing the result of the simulation. The horizontal axis of FIG. 5 represents the inclination angle θ (°), and the vertical axis of FIG. 5 represents the amount of the fluorescence Y on the screen (%). The amount of fluorescence Y on the screen is defined as the ratio of the amount of fluorescence Y that is outputted from the light source apparatus 100 and reaches the screen at each of the inclination angles θ to the amount of fluorescence Y that is outputted from the light source apparatus 200 according to Comparative Example and reaches the screen, which is assumed to be 100%.

The amount of fluorescence Y on the screen tends to increase as the inclination angle θ is increased from 15°, as shown in FIG. 5. The amount of fluorescence Y on the screen becomes 100% when the inclination angle θ is 40°. As the inclination angle θ is increased from 40°, the amount of fluorescence Y on the screen further increases, and the amount of fluorescence Y on the screen is maximized when the inclination angle θ is 45°. The amount of fluorescence Y on the screen, however, tends to decrease as the inclination angle θ is increased from 45°. The amount of fluorescence Y on the screen becomes 100% again when the inclination angle θ is 58°. As the inclination angle θ is increased from 58°, the amount of fluorescence Y on the screen further decreases to values smaller than 100%.

The results described above demonstrate that the inclination angle needs to be greater than or equal to 40° but smaller than or equal to 58° in the light source apparatus 100 according to the present embodiment to make the amount of fluorescence Y on the screen greater than or equal to that achieved by the light source apparatus 200 according to Comparative Example.

The present inventor then conducts a simulation on the rate of change in the amount of fluorescence (expressed in W) extracted from the light source apparatus 100 by changing the length of one side of the sixth surface 54f with the inclination angle θ fixed at 45°, where the amount of fluorescence Y on the screen is maximized, in the light source apparatus 100 according to the present embodiment.

Figure 6:
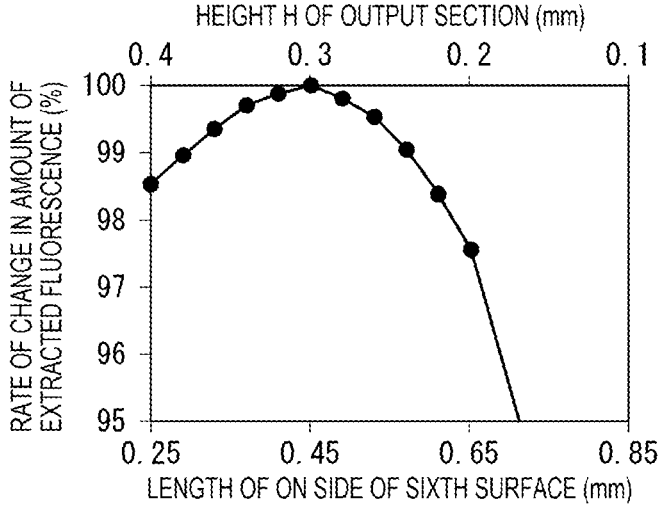
FIG. 6 is a graph showing the relationship of the rate of change in the amount of extracted light with the length of one side of a sixth surface and the height of the output section.

FIG. 6 is a graph showing the result of the simulation. The lower horizontal axis of FIG. 6 represents the length (mm) of one side of the sixth surface 54f, and the vertical axis of FIG. 6 represents the rate of change in the amount of extracted fluorescence Y (%). The rate of change (%) in the amount of extracted fluorescence Y is defined as the ratio of each amount of extracted fluorescence Y to the amount of maximum extracted fluorescence Y, which is assumed to be 100%. Since the inclination angle θ is fixed in the simulation, the distance between the first surface 54a and the sixth surface 54f, that is, the height of the output section 54 (truncated quadrangular pyramid) changes as the length of one side of the sixth surface 54f changes. To show the change, the upper horizontal axis of FIG. 6 represents the height H (mm) of the output section 54 (truncated quadrangular pyramid). The length of one side of the first surface 54a of the output section 54 was set at 1.0 mm.

The rate of change in the amount of extracted fluorescence Y tends to increase as the length of one side of the sixth surface 54f is increased from 0.25 mm, as shown in FIG. 6. When the length of one side of the sixth surface 54f is 0.45 mm, the rate of change in the amount of extracted fluorescence Y becomes 100%. At this point, the height of the output section 54 is 0.3 mm. The rate of change in the amount of extracted fluorescence Y tends to decrease as the length of one side of the sixth surface 54f is increased from 0.45 mm.

Figure 7:
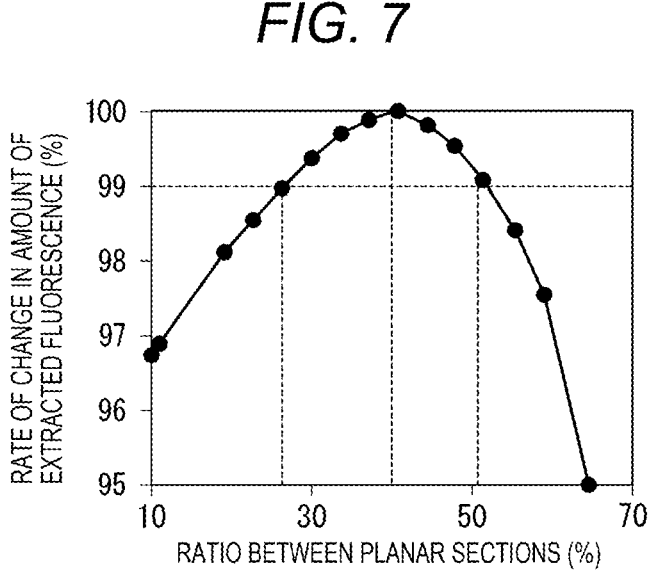
FIG. 7 is a graph showing the relationship of the rate of change in the amount of extracted light with the ratio of the area of the sixth surface to the area of a first surface.

FIG. 7 is a rewritten version of FIG. 6 with the horizontal axis representing the ratio (%) of the area of the sixth surface 54f to the area of the first surface 54a.

The rate of change in the amount of extracted fluorescence Y tends to increase as the ratio of the area of the sixth surface 54f to the area of the first surface 54a is increased from 10%, as shown in FIG. 7. When the ratio of the area of the sixth surface 54f to the area of the first surface 54a is 41%, the rate of change in the amount of extracted fluorescence Y becomes 100%. The rate of change in the amount of extracted fluorescence Y tends to decrease as the area of the sixth surface 54f to the area of the first surface 54a is increased from 41%. Setting the ratio of the area of the sixth surface 54f to the area of the first surface 54a to fall within a range from 26% to 51% ensures the rate of change in the amount extracted fluorescence Y of at least 99% of the maximum. In contrast, when the ratio of the area of the sixth surface 54f to the area of the first surface 54a does not fall within the range from 26% to 51%, the rate of change in the amount extracted fluorescence Y sharply decreases.

The results described above demonstrate that the ratio of the area of the sixth surface 54f to the area of the first surface 54a needs to be greater than or equal to 26% but smaller than or equal to 51% to ensure the amount of extracted fluorescence Y in a stable manner.

The present inventor has then conducted a simulation on the rate of change in the amount of fluorescence extracted from the light source apparatus 100 according to the present embodiment by changing a value R, by which the corner 58, where the side surface 50g of the wavelength conversion member 50 and the side surface 54p of the output section 54 are in contact with each other, is roundly chamfered.

Figure 8:
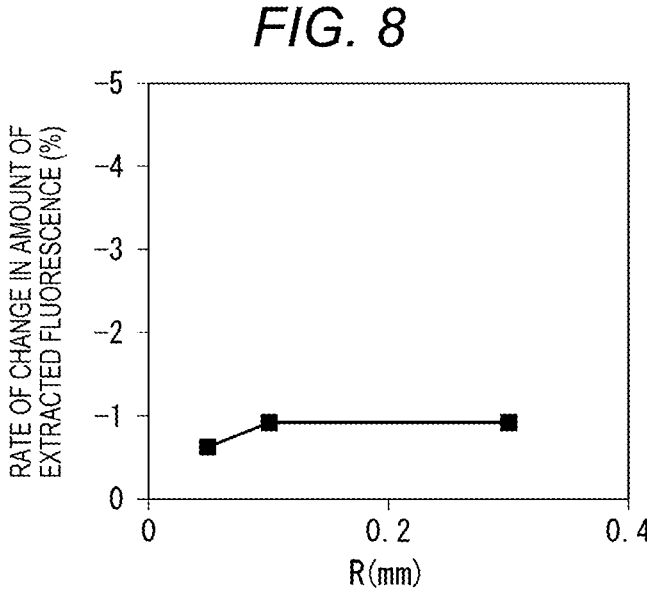
FIG. 8 is a graph showing the relationship of the rate of change in the amount of extracted light with a value R by which a corner is chamfered.

FIG. 8 is a graph showing the result of the simulation. The horizontal axis of FIG. 8 represents the value R (mm) by which the corner 58 is roundly chamfered, and the vertical axis of FIG. 8 represents the rate of change in the amount of extracted fluorescence Y (%). The rate of change (%) in the amount of extracted fluorescence Y is defined as the ratio of each amount of extracted fluorescence Y to the amount of extracted fluorescence Y achieved when the corner 58 is not roundly chamfered, which is assumed to be 100%.

FIG. 8, which shows negative values of the rate of change in the amount of extracted fluorescence Y, demonstrates that the rate of change in the amount of extracted fluorescence Y in the case where the corner 58 is roundly chamfered decreases as compared with the rate in the case where the corner 58 is not roundly chamfered. FIG. 8, however, demonstrates that changes in R do not greatly change the rate of change in the amount of extracted fluorescence Y, and that the amount of decrease from the case where the corner 58 is not roundly chamfered is smaller than or equal to −1%.

Effects of Embodiment

The light source apparatus 100 according to the present embodiment includes the light emitters 56, which each output the excitation light E having the first wavelength band, the wavelength conversion member 50, which contains a fluorophore and converts the excitation light E outputted from the light emitters 56 into the fluorescence Y having the second wavelength band, and the output section 54, which is provided along the center axis J of the wavelength conversion member 50 and outputs the fluorescence Y generated by the wavelength conversion member 50. The output section 54 includes the first end section 54j having the first surface 54a facing the wavelength conversion member 50, the second end section 54k located at the side opposite from the first end section 54j along the center axis J, the second surface 54b, the third surface 54c, the fourth surface 54d, and the fifth surface 54e, which are in contact with the first end section 54j and the second end section 54k. The cross-sectional area of the output section 54 taken along a plane perpendicular to the center axis J gradually decreases from the first end section 54j toward the second end section 54k. The second surface 54b, the third surface 54c, the fourth surface 54d, and the fifth surface 54e each incline with respect to the first surface 54a, and the inclination angle θ of each of the second surface 54b, the third surface 54c, the fourth surface 54d, and the fifth surface 54e with respect to the first surface 54a is greater than or equal to 40° but smaller than or equal to 58°.

The configuration described above, in which the inclination angle θ of the side surface 54p of the output section 54 is set at a value greater than or equal to 40° but smaller than or equal to 58°, can achieve a light source apparatus 100 that increases the efficiency at which the fluorescence Y is used by a downstream optical system in the light source apparatus 100 and provides an amount of fluorescence Y on the screen greater than or equal to the amount of fluorescence Y achieved by a light source apparatus including an angle conversion member, such as a CPC, when the light source apparatus having the configuration described above is incorporated in a projector.

In the light source apparatus 100 according to the present embodiment, the second surface 54b, the third surface 54c, the fourth surface 54d, and the fifth surface 54e of the output section 54 are each provided with no reflection layer.

According to the configuration described above, the fluorescence Y outputted from the wavelength conversion member 50 is totally reflected off the second surface 54b, the third surface 54c, the fourth surface 54d, and the fifth surface 54e of the output section 54, and travels toward the second end section 54k. In this case, since the second surface 54b, the third surface 54c, the fourth surface 54d, and the fifth surface 54e are each provided with no reflection layer, the fluorescence Y is not absorbed by a reflection layer, whereby the loss of the fluorescence Y can be suppressed.

In the light source apparatus 100 according to the present embodiment, the second end section 54k of the output section 54 has the sixth surface 54f, which is in contact with each of the second surface 54b, the third surface 54c, the fourth surface 54d, and the fifth surface 54e, and intersects with the center axis J.

According to the configuration described above, the fluorescence Y having been totally reflected off the second surface 54b, the third surface 54c, the fourth surface 54d, and the fifth surface 54e, and having reached the second end section 54K is refracted at the sixth surface 54f and outputted from the output section 54 via the sixth surface 54f. The angular distribution of the fluorescence Y outputted from the light source apparatus 100 is therefore narrower than that in a case where the output section 54 does not have the sixth surface 54f, whereby the efficiency at which the fluorescence Y is used by a downstream optical system can be increased.

In the light source apparatus 100 according to the present embodiment, the ratio of the area of the sixth surface 54f to the area of the first surface 54a is greater than or equal to 26% but smaller than or equal to 51%.

According to the configuration described above, the amount of fluorescence Y outputted from the light source apparatus 100 can be ensured in a stable manner, as indicated by the results of the simulations described above.

In the light source apparatus 100 according to the present embodiment, the wavelength conversion member 50 has the output surface 50a, via which the fluorescence Y is outputted, and the side surface 50g, which intersects with the output surface 50a, and the chamfered section 59 is provided at the corner 58, where the second surface 54b, the third surface 54c, the fourth surface 54d, and the fifth surface 54e of the output section 54 are each in contact with the side surface 50g.

According to the configuration described above, providing the corner section 58 with the chamfered section 59 while reducing a decrease in the rate of change in the amount of fluorescence Y outputted from the light source apparatus 100 makes the corner 58 unlikely to be damaged, as indicated by the results of the simulations described above.

In the light source apparatus 100 according to the present embodiment, the wavelength conversion member 50 and the output section 54 are integrated into a single member.

According to the configuration described above, there is no need to bond the wavelength conversion member and the angle conversion member to each other with an adhesive, so that there is no problem of reduced reliability of the bonded portion due to light or heat. Furthermore, there is no problem of reduced efficiency at which the fluorescence Y is used due to absorption of the fluorescence Y by the adhesive.

The projector 1 according to the present embodiment, which includes the light source apparatus 100 according to the present embodiment, excels in the light utilization efficiency.

The technical scope of the present disclosure is not limited to the embodiment described above, and a variety of changes can be made thereto to the extent that the changes do not depart from the intent of the present disclosure. An aspect of the present disclosure can be an appropriate combination of the characteristic portions in the embodiment described above.

In the embodiment described above, the output section has a truncated quadrangular pyramidal shape, and may instead have a quadrangular pyramidal shape. That is, the output section may have the second, third, fourth, and fifth surfaces but may not have the sixth surface. In other words, the ratio of the area of the sixth surface to the area of the first surface may be 0%. In the embodiment described above, one output section is provided at the output surface of the wavelength conversion member, and a plurality of output sections may be provided. For example, a plurality of output sections may be provided in the form of an array at the output surface of the wavelength conversion member.

In the embodiment described above, the wavelength conversion member and the output section are integrated into a single member, and the wavelength conversion member and the output section may instead be formed of members separate from each other. When the wavelength conversion member and the output section are formed of members separate from each other, the output section may contain a fluorophore and therefore have the wavelength conversion function, or may not contain a fluorophore and therefore have no wavelength conversion function.

In addition, the specific descriptions of the shape, the number, the arrangement, the material, and other factors of each of the components of the light source apparatus and the projector are not limited to those in the embodiment described above and can be changed as appropriate. The aforementioned embodiment has been described with reference to the case where the light source apparatus according to the present disclosure is incorporated in a projector using liquid crystal panels, but not necessarily. The light source apparatus according to the present disclosure may be incorporated in a projector using a digital micromirror device as each of the light modulators. The projector may not include a plurality of light modulators and may instead include only one light modulator.

The aforementioned embodiment has been described with reference to the case where the light source apparatus according to the present disclosure is incorporated in a projector, but not necessarily. The light source apparatus according to the present disclosure may be used as a lighting apparatus, a headlight of an automobile, and other components.

A light source apparatus according to an aspect of the present disclosure may have the configuration below.

A light source apparatus according to an aspect of the present disclosure includes a light emitter that emits first light having a first wavelength band, a wavelength conversion member that contains a fluorophore and converts the first light emitted from the light emitter into second light having a second wavelength band different from the first wavelength band, and an output section that is provided along the center axis of the wavelength conversion member and outputs the second light generated by the wavelength conversion member. The output section includes a first end section having a first surface facing the wavelength conversion member, a second end section located at the side opposite from the first end section along the center axis, a second surface in contact with the first and second end sections, a third surface in contact with the first and second end sections, a fourth surface in contact with the first and second end sections, and a fifth surface in contact with the first and second end sections. The cross-sectional area of the output section taken along a plane perpendicular to the center axis gradually decreases from the first end section toward the second end section. The second, third, fourth, and fifth surfaces each incline with respect to the first surface. The inclination angle of each of the second, third, fourth, and fifth surfaces with respect to the first surface is greater than or equal to 40° but smaller than or equal to 58°.

In the light source apparatus according to the aspect of the present disclosure, the second, third, fourth, and fifth surfaces may each be provided with no reflection layer.

In the light source apparatus according to the aspect of the present disclosure, the second end section may have a six surface that is in contact with each of the second, third, fourth, and fifth surfaces and intersects with the center axis.

In the light source apparatus according to the aspect of the present disclosure, the ratio of the area of the sixth surface to the area of the first surface may be greater than or equal to 26% but smaller than or equal to 51%.

In the light source apparatus according to the aspect of the present disclosure, the wavelength conversion member may have an output surface via which the second light is outputted and a side surface that intersects with the output surface, and the corner where the second, third, fourth, and fifth surfaces are each in contact with the side surface may be provided with a chamfered section.

In the light source apparatus according to the aspect of the present disclosure, the wavelength conversion member and the output section may be integrated into a single member.

A projector according to another aspect of the present disclosure may have the configuration below.

The projector according to the other aspect of the present disclosure includes the light source apparatus according to the aspect of the present disclosure, a light modulator that modulates light outputted from the light source apparatus and containing the second light in accordance with image information, and a projection optical apparatus that projects the light modulated by the light modulator.

What is claimed is:
1. A light source apparatus comprising:
a light emitter that emits first light having a first wavelength band;
a wavelength conversion member that contains a fluorophore and converts the first light emitted from the light emitter into second light having a second wavelength band different from the first wavelength band; and an output section that is provided along a center axis of the wavelength conversion member and outputs the second light generated by the wavelength conversion member, wherein the output section includes a first end section having a first surface facing the wavelength conversion member, a second end section located at a side opposite from the first end section along the center axis, a second surface in contact with the first and second end sections, a third surface in contact with the first and second end sections, a fourth surface in contact with the first and second end sections, and a fifth surface in contact with the first and second end sections, a cross-sectional area of the output section taken along a plane perpendicular to the center axis gradually decreases from the first end section toward the second end section, the second, third, fourth, and fifth surfaces each incline with respect to the first surface, and an inclination angle of each of the second, third, fourth, and fifth surfaces with respect to the first surface is greater than or equal to 40° but smaller than or equal to 58°.

2. The light source apparatus according to claim 1, wherein the second, third, fourth, and fifth surfaces are each provided with no reflection layer.

3. The light source apparatus according to claim 1, wherein the second end section has a six surface that is in contact with each of the second, third, fourth, and fifth surfaces and intersects with the center axis.

4. The light source apparatus according to claim 3, wherein a ratio of an area of the sixth surface to an area of the first surface is greater than or equal to 26% but smaller than or equal to 51%.

5. The light source apparatus according to claim 1, wherein the wavelength conversion member has an output surface via which the second light is outputted and a side surface that intersects with the output surface, and a corner where the second, third, fourth, and fifth surfaces are each in contact with the side surface is provided with a chamfered section.

6. The light source apparatus according to claim 1, wherein the wavelength conversion member and the output section are integrated into a single member.

7. A projector comprising:

the light source apparatus according to claim 1;

a light modulator that modulates light outputted from the light source apparatus and containing the second light in accordance with image information; and a projection optical apparatus that projects the light modulated by the light modulator.

*　*　*　*　*